Dec. 14, 1937.   R. S. BROWN   2,102,567
SAFETY FEED KNOCK-OUT
Filed Sept. 12, 1936   3 Sheets-Sheet 1
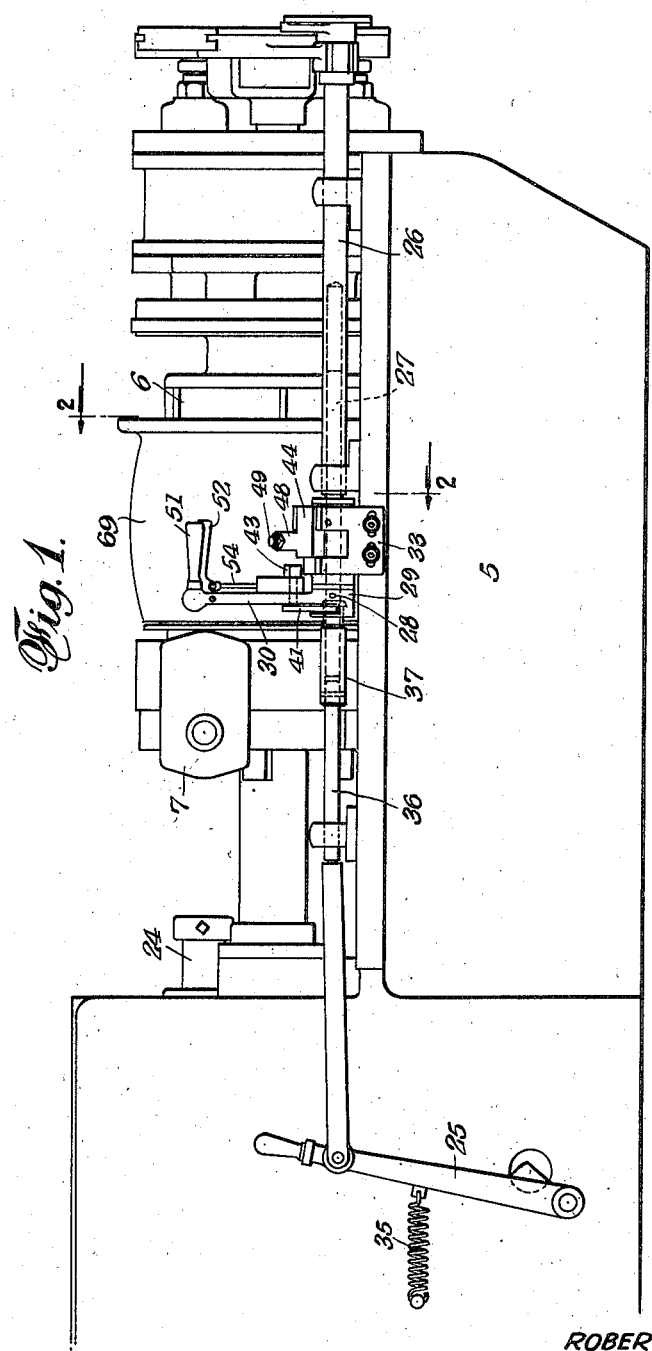
INVENTOR
ROBERT S. BROWN
BY
ATTORNEYS

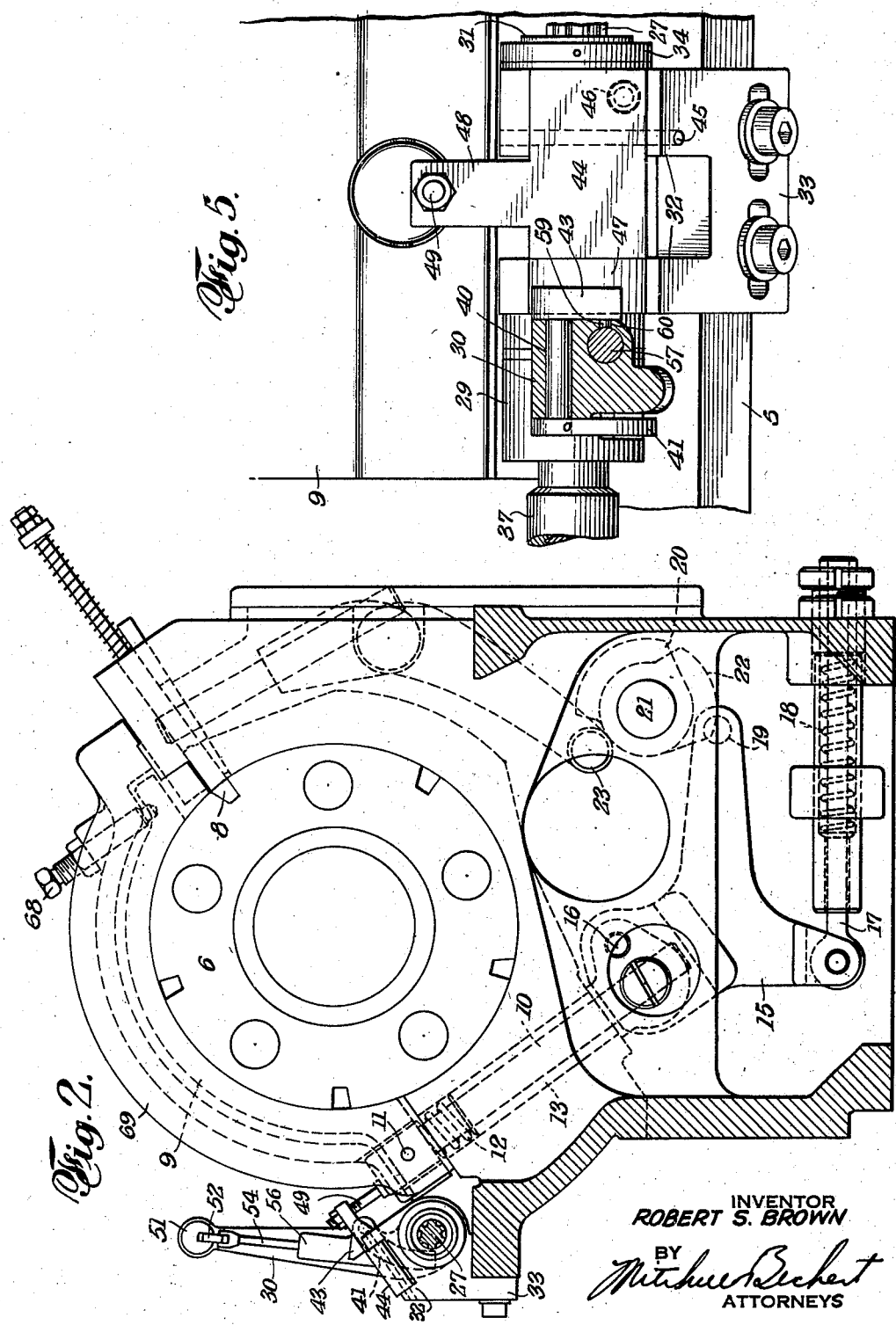

Dec. 14, 1937.  R. S. BROWN  2,102,567
SAFETY FEED KNOCK-OUT
Filed Sept. 12, 1936  3 Sheets-Sheet 3
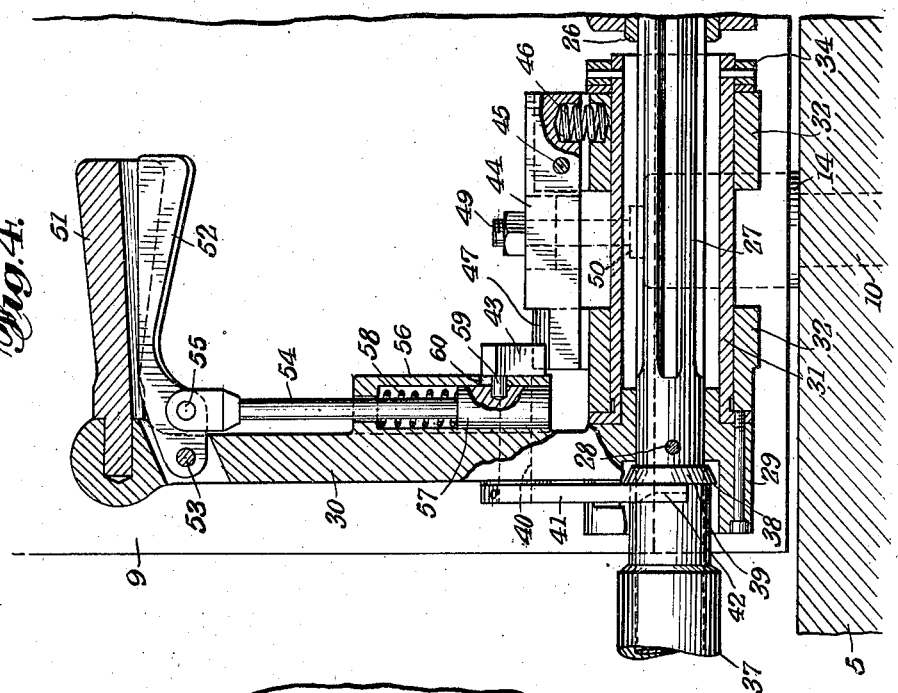
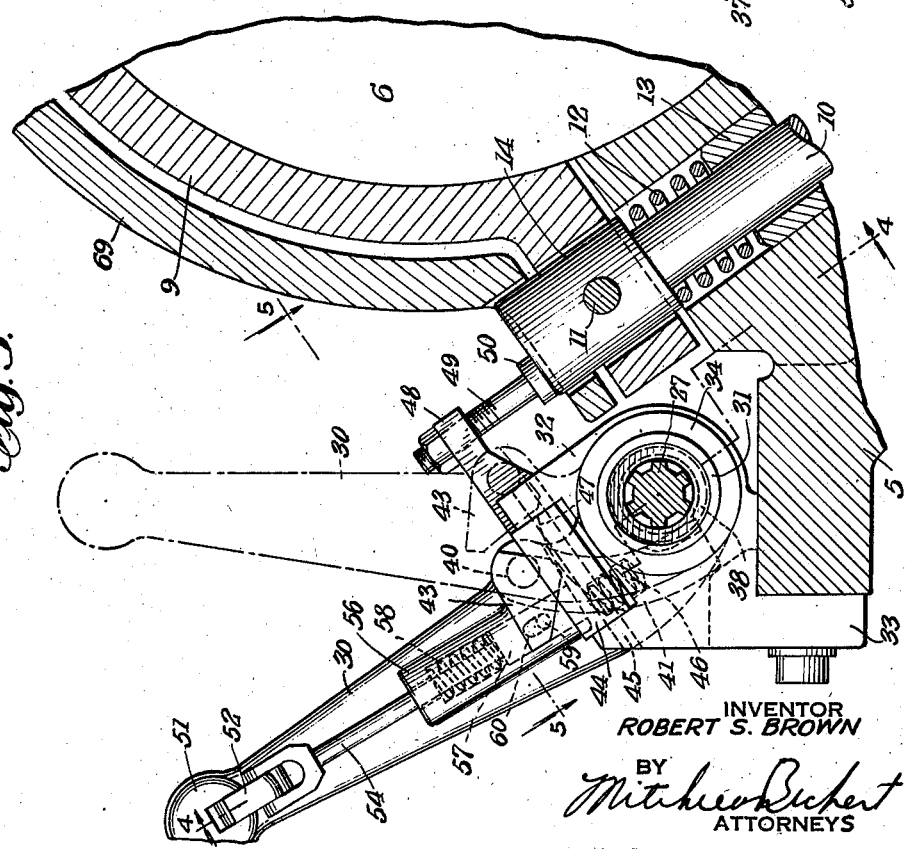
INVENTOR
ROBERT S. BROWN
BY
Mitchell Bichert
ATTORNEYS Patented Dec. 14, 1937

2,102,567

UNITED STATES PATENT OFFICE 2,102,567

SAFETY FEED KNOCK-OUT

Robert S. Brown, New Britain, Conn., assignor to The New Britain Machine Company, New Britain, Conn., a corporation of Connecticut Application September 12, 1936, Serial No. 100,517

15 Claims. (Cl. 29—38)

My invention relates to an indexing station type machine and more particularly to a safety feed knock out for a multiple spindle indexing station type chucking machine.

Many machines of the character indicated are provided with means for automatically disengaging the feed clutch at the completion of each cycle. The operator then chucks a new work piece and thereafter manually engages the feed clutch to start a new cycle. Such machines, while always giving the operator all of the time necessary or desired for chucking a work piece, are inclined to be slow in production since the operation of starting each cycle depends upon the manual act of the operator. Other chucking machines are arranged to index continuously, that is, perform cycle after cycle without stopping and the operator removes a finished piece and chucks a new work piece while the turret is stopped between indexing motions. Such continuously operating chucking machines, whilst quicker to produce finished work, may yet require a longer time to initiate an inexperienced or a new operator who apprehends inability to do the chucking in the time the turret is stopped between indexing motions or one who feels that a work piece is not properly seated in chuck and would like to rechuck it before the turret moves away from loading station.

It is the principal object of my invention to provide a machine for automatically indexing in a continuous manner, that is to say, in a continuous series of cycles and to provide novel and improved means for automatically disengaging the feed clutch in the event the operator is unable to properly chuck a new work piece in the interval between indexing movements of the turret.

It is a further object to provide a machine of the character last indicated with an improved combined automatic and manual feed clutch disengaging means.

A further object is to provide a machine of the character indicated having improved automatic and manual clutch disengaging means controllable simultaneously in all positions by one hand of the machine operator.

Another object is to provide an automatic clutch disengaging means for an automatic chucking machine dependent for operation entirely upon the manual positioning of the chuck control means.

Another object is to provide a machine of the character indicated with a feed clutch at all times urged to open position and held or latched in engaged position, together with means conveniently situated with relation to the operator for almost instantaneously unlatching the means for holding the feed clutch engaged.

Another object is to provide an automatic chucking machine with automatic clutch throw-out means timed to act under certain conditions just prior to indexing of the indexible turret and actuated by means timed with the indexing functions of the machine and independently of all variable camming, such as the camming of a tool slide, tool holder, or the like.

Other objects and various features of invention will be hereinafter pointed out or will become apparent to those skilled in the art.

The invention will be disclosed herein as applied to a multiple spindle chucking machine, as shown in my prior Patent, No. 1,973,368, of September 11, 1934, to which reference is hereby made for fuller disclosure of the machine herein illustrated only in part.

In the drawings which show, for illustrative purposes only, a preferred form of the invention—

Fig. 1 is a front side view of an automatic chucking machine as disclosed in my said patent and illustrating features of the present invention;

Fig. 2 is a sectional view taken substantially in the plane of the line 2—2 of Fig. 1, the indexible turret being shown in end elevation;

Fig. 3 is a fragmentary, sectional view on an enlarged scale of parts shown in Figs. 1 and 2;

Fig. 4 is a sectional view taken substantially in the planes of the broken line 4—4 of Fig. 3;

Fig. 5 is a sectional view taken substantially in the plane of the line 5—5 of Fig. 3.

In said drawings and as is more fully set forth in my aforesaid patent, the illustrated machine to which my invention is applied includes a base 5, which supports an indexible turret 6. The turret 6 carries a plurality of chucks, indicated generally at 7 and corresponding in number and position to the five longitudinally extending holes in the turret shown in Fig. 2. The turret is indexed by means fully illustrated in my aforesaid patent. The turret is locked or located in indexed positions by means of a locking bolt 8 and is further locked or clamped by means of the clamping strap 9 under the cap 69 forming the top portion of the turret bearing. The clamping strap 9 is hingedly mounted under the cap 69 and held by pivot screw 68 at one side and at the opposite side is engaged by a clamping draw rod 10, which may be secured to the strap by means of a pin 11. The clamping strap is urged toward open position to release the turret for indexing, by means of a spring 12 interposed between a bushing 13 in a bore in the frame and the underside of the head 14 on the clamping draw rod 10. The clamping strap 9 is drawn down into turret clamping position by spring means and is positively moved toward open or unclamping position by means of a cam. As illustrated, the draw rod 10 is pivotally secured to a lever 15 which is itself pivoted at 16 to the frame. The lever 15 has an arm which is pivotally secured to a draw rod 17 urged toward the right by means of a compression spring 18 so as to resiliently swing the lever 15 about its pivot and draw it downwardly to urge the clamping cap into clamping position on the turret. Another arm on the lever 15 carries a cam roll 19 engageable by a cam 20 on the cam shaft 21, so that when the cam 20 engages the cam roll 19, the lever 15 will be swung about its pivot 16 and the clamping rod 10 will positively move the clamping strap 9 to open position. The cam shaft 21 carries a second cam 22, engageable with a cam roll 23, for disengaging the locking bolt 8 from the locking slots or notches in the turret, as will be understood.

The machine turret illustrated carries chucks non-rotatably secured thereto and there are a plurality of rotatable spindles, such as the spindle 24, the number of spindles usually being one less than the number of chucks so that when each chuck reaches one station, that is the loading station, the finished work piece may be removed and a new work piece inserted. The spindles and chucks are fed relatively to each other, in the present instance the spindles themselves being individually fed up to the work in the chucks. The feed works of the machine, which of course includes the indexing means for the turret, are controlled by a feed clutch and feed clutch lever 25, as will be clearer from a study of my aforesaid patent. The chucks as illustrated in my aforesaid patent are fluid pressure actuated and chucking and unchucking take place in the loading station. Without going into detail herein, it will suffice to say, for the purposes of the present invention, that the chucking and unchucking in the loading station are effected by oscillation of the shaft 26.

The machine is designed for intermittent indexing in a continuous manner, that is to say, the machine is designed to go through cycle after cycle and the operator is supposed to keep in step with the machine and remove a finished work piece and chuck a new work blank during the interval between indexing movements of the turret.

My invention relates particularly to means for automatically disengaging the feed clutch of the machine if for any reason the operator is unable to properly chuck a work piece in the loading station in the interval of time between indexing movements. As stated, the chucking and unchucking are effected by oscillation of the shaft 26. The latter in the form shown is splined to a shaft 27 and the latter is secured as by means of a pin 28 to the hub 29 of a manual chucking lever 30. The hub 29 has secured thereto a sleeve or bushing 31 mounted in spaced apart eyes or bearings 32—32 on the bracket 33, adjustably secured to the frame of the machine. The bushing is held in the bearings by a flange at one end and a collar 34 pinned thereto at the opposite end. It will be seen, therefore, that by rocking the lever the shaft 26 will be oscillated and chucking and unchucking effected. When the lever is rocked to its innermost position as shown in dot-dash lines in Fig. 3, the shaft 26 is in position to cause the chuck in loading station to be chucked. When the lever 30 is moved to its full line position of Fig. 3, the chuck in loading station is opened.

I have provided improved means for automatically throwing the feed clutch of the machine just prior to indexing if at that time the manual chucking lever 30 is in position other than its innermost or dot-dash position of Fig. 3. In the form illustrated, the feed clutch is constantly urged toward open or disengaged position by means of a spring 35 secured to the frame and the feed clutch lever 25, as will be understood. A feed clutch connecting rod 36 is secured to the lever 25 and at the right hand end carries a sleeve or coupling 37 pinned thereto and which is bored to slidably receive the left hand end of the splined shaft 27 so that the coupling 37 pilots on the end of such splined shaft. The coupling 37 is necked so as to provide a radially extending circumferential flange 38 and the forward end is tapered so as to form a tapered camming nose 39. The hand lever 30 carries a stud 40 which has fixed thereto a latch finger 41 which engages behind the flange 38 so as to hold the feed clutch lever 25 in its right hand or engaged position as shown in Fig. 1. It may be here stated that the opposite face of the latch finger 41 is tapered or provided with a cam surface 42 engageable by the tapered nose 39 on the coupling 37 so that when the feed clutch lever 25 is moved toward its engaged position, the nose 39 engaging the tapered surface 42 will cam the latch out so as to ride over the nose 39 and drop in behind the radial flange 38 to hold the feed clutch lever 25 in engaged position. It will be seen that as soon as the latch finger 41 is moved out so as to release the coupling 37, the spring 35 will almost instantaneously draw the feed clutch lever 25 so as to disengage the feed clutch.

I have provided means timed with or actuated by one of the turret locking members for automatically rocking the latch finger 41 in case the manual clutch control handle 30 is not in its innermost or dot-dash position of Fig. 3 just prior to the normal time of indexing of the machine. As shown more particularly in Figs. 3, 4 and 5, the stud 40, rotatably carried by the hand lever 30, is provided at its opposite end with an actuating lever or latch member 43. The bracket 33 carries a cam latch 44 pivotally secured thereto as by means of a pin 45 and urged about said pivot by means of a compression spring 46 interposed between the end of the cam latch and a part of the bracket 33. The opposite end of the cam latch has an arcuate surface 47 concentric with the axis of the chucking lever 30 and is positioned beneath the lever or actuator 43 heretofore indicated as being unitarily movable with the stud 40 and latch finger 41. The cam latch 44 has a rearwardly extending arm 48 which carries an adjustable trip means in the form of a screw 49 adjustably secured in the leg 48 and having a head 50 engageable with the top surface of the clamping cap draw rod 10, as clearly shown in Fig. 3. The spring 46 always urges the cam latch 44 in counterclockwise direction, as illustrated in Fig. 4, and the cam latch is rocked in the other direction only when the clamping cap draw rod 10 is moved upwardly to release the clamping strap 9. Now, if the operator during the time that the turret was clamped in indexed position has been unable to properly chuck a new work piece by moving the chuck control handle 30 to its chuck closed or dot-dash position of Fig. 3, it will be seen that the actuator or lever 43 will be positioned over some part of the arcuate surface 47, that is, if the handle 30 is in, say, the position of Fig. 3, or in fact in any position other than the dot-dash position of Fig. 3. If the handle, is, say, in the position shown in Fig. 3 just prior to indexing, the rod 10 will be raised to release the clamping strap 9. Such raising of the rod 10 will through the trip rod 49 rock the cam latch 44 and the cam surface 47 engaging beneath the actuator or lever 43 will rock the same and the latch finger 41 so as to disengage the latter from behind the flange 38 on the coupling 37, and the spring 35 will immediately draw the feed clutch handle 25 toward the left to disengage the feed clutch and thus prevent indexing. Therefore, an operator has the assurance that should he fail to chuck a new work blank in the time allotted by the timing of the machine, the feed works will be thrown out and he need have no apprehension for his own safety or for that of the machine. When a new work piece is chucked by moving the handle 30 to its dot-dash position of Fig. 3, it will be clear that the actuator 43 will be in position to entirely clear the cam latch surface 47 and the latter will of course have no effect on it and the latch finger 41. After the feed clutch has been disengaged, the feed clutch lever 25 may be manually moved to again throw in the feed works and in so moving the lever the tapered nose 39 will cam out the latch finger 41 and permit the same to drop into its latching position 38 and thus hold the feed clutch engaged.

In addition to the automatic feed clutch knock out means actuable each time the operator fails to move the chuck control handle to the chuck closed position prior to indexing, I have provided manual means for throwing the feed clutch at any time during the cycle, regardless of the position of the chuck control lever 30. In the form illustrated the lever 30 is provided with a handle 51 which may be conveniently grasped for rocking the lever back and forth for chucking and unchucking work pieces. Beneath the handle is what may be termed a feed trip trigger 52 pivoted to the handle at 53. It will be clear that by merely closing the hand about the handle 51 and trip trigger 52, the latter will be rocked about the pivot 53. The trip trigger 52 carries a trigger rod 54 pivotally secured thereto at 55. The trigger rod passes through the bored boss 56 on the lever 30 and has a head 57 fitting within the bore. A light spring 58 at all times tends to depress the head 57 and maintain the feed trip trigger 52 in its lowermost position as shown in Fig. 4. The latch actuator 43 carries a stud 59 which projects through a slot 60 in the boss 56 and engages a transverse aperture in the head 57, as will be clear from Fig. 4. Therefore, when the feed trip trigger 52 is raised, as by grasping it and the handle portion 51, the pin 59 will be raised and thus rock the actuator 43 in exactly the same manner as the latter would be rocked by the cam surface 47 on the cam latch 44 and the latch finger 41 will be rocked so as to release the coupling 37 and feed clutch control handle 25. It will be clear that the feed trip trigger 52 may be actuated in any and all positions of the lever 30 so that the feed works are under instant control of the operator who would normally at all times keep one hand on the chucking lever.

Thus, if an operator should chuck a work piece and just before or during indexing he should notice that the piece was improperly chucked, he could almost instantly throw out the feed works before the work piece reached the first work station and tool damage might thus be averted.

It will be seen that I have provided a machine which may be timed for its best rate of production and work pieces fed by the operator normally in the interval between indexing movements. I have also provided means to entirely relieve the mind of the operator should he be unable to chuck a new work piece during the normal time allotted. A new operator, with my improved safety feed knock out, may work with perfect confidence and without fear of injury to himself or the machine by reason of indexing if he is able to chuck a work piece in the normal time allowed. Furthermore, by actuating my improved safety feed knock out by means at all times actuated just prior to indexing and which time would never change (as might be the case were the device actuated by variously cammed feed devices), the operator is given the maximum time for removing a finished work piece and chucking a new blank.

While the invention has been described in connection with a particular type of machine, that is the tool rotating type, and in connection with which it is of great value, it is to be understood that the invention is applicable to machines of other types and that various changes and modifications may be made within the scope of the invention as defined in the appended claims.

I claim:

1. In a machine of the character indicated, an indexible chuck carrier, means for securing the same in indexed position between indexing movements thereof, a feed clutch, a plurality of chucks carried by said chuck carrier, chuck actuating means, a control member for said chuck actuating means, and means controlled by said means for securing said chuck carrier in indexed position and timed to act just prior to indexing of said chuck carrier for disengaging said feed clutch when said chuck control member is in open chuck position.

2. In a machine of the character indicated, an indexible chuck carrier, a plurality of chucks carried thereby, a feed clutch, chuck actuating means, a chuck control member for controlling the same, means timed to act just prior to indexing of said chuck carrier for automatically disengaging said feed clutch when said chuck control member is in one position, and means associated with said chuck control member and actuable in all positions thereof for manually disengaging said feed clutch.

3. In a machine of the character indicated, an indexible chuck carrier, a plurality of chucks carried thereby, chuck actuating means, a chuck control member for controlling the same, a feed clutch, automatic means for throwing said feed clutch just prior to indexing said chuck carrier and operable to throw said feed clutch only when said chuck control member is in chuck open position, manual means for throwing said feed clutch regardless of the position of said chuck control member, said manual means and said chuck control member being simultaneously engageable by one hand of an operator in all positions of said members.

4. In a machine of the character indicated, an indexible chuck carrier, a plurality of chucks carried thereby, chuck actuating means, a chuck control lever limited to an oscillating movement, a feed clutch, means timed to act just prior to indexing of said chuck carrier for automatically throwing said feed clutch when said lever is oscillated to any position other than chuck closed position, and manual means associated with said lever for manually throwing said feed clutch regardless of the position of said lever.

5. In a machine of the character indicated, an indexible chuck carrier, a plurality of chucks carried thereby, chuck actuating means, a chuck control member, a feed clutch, means for constantly urging said feed clutch toward open position, means for holding said feed clutch in closed position, and means for selectively releasing said feed clutch manually and automatically, for the purpose described.

6. In a machine of the character indicated, an indexible chuck carrier, a plurality of chucks carried thereby, chuck actuating means, a chuck control member, a feed clutch, and means including said chuck control member and timed to act just prior to indexing and dependent upon the position of said chuck control member for automatically throwing said feed clutch, and means associated with said chuck control member for manually throwing said feed clutch at will regardless of the position of said chuck control member.

7. In a machine of the character indicated, an indexible chuck carrier, a plurality of chucks carried thereby, chuck actuating means, a chuck control lever, a feed clutch, means timed to act just prior to indexing of said chuck carrier and dependent upon the position of said chuck control lever for automatically throwing said feed clutch when said chuck control lever is in chuck open position, and manual means associated with said chuck control lever and operable when moving said chuck control lever for manually throwing said clutch at will.

8. In a machine of the character indicated, an indexible chuck carrier, locking means therefor, a plurality of chucks carried by said chuck carrier, chuck actuating means, a chuck control member, a feed clutch, and means actuated by said locking means for automatically throwing said feed clutch when said chuck control member is in chuck open position.

9. In a machine of the character indicated, an indexible chuck carrier, a plurality of chucks carried thereby, chuck actuating means, a chuck control lever, and manual means associated with said chuck control lever for manually throwing said feed clutch, said means being operable by the hand engaging said chuck control lever.

10. In a machine of the character indicated, an indexible chuck carrier, a plurality of chucks carried thereby, chuck actuating means, a feed clutch, and means associated with said chuck actuating means for throwing said feed clutch both manually and automatically.

11. In a machine of the character indicated, an indexible chuck carrier, a plurality of chucks carried thereby, chuck actuating means, a chuck control lever, a feed clutch, means associated with said chuck control member for manually throwing said feed clutch, and means timed to act just prior to indexing of said turret for actuating said means for throwing said feed clutch.

12. In a machine of the character indicated, an indexible chuck carrier, a plurality of chucks carried thereby, chuck actuating means, a chuck control member, a feed clutch, means for resiliently urging said feed clutch to open position, latch means for holding said feed clutch in closed position, and means timed to act just prior to indexing of said turret and operable to release said latch means to open said clutch when said chuck control member is in open chuck position.

13. In a machine of the character indicated, an indexible chuck carrier, a plurality of chucks carried thereby, chuck actuating means, a chuck control lever, a feed clutch, and means carried by said chuck control lever for manually throwing said feed clutch and operable while said chuck control member is stationary.

14. In a machine of the character indicated, an indexible carrier, a plurality of work holders indexible with said carrier, a plurality of tools, means for rotating said work holders and tool holders relatively to each other, a fluid pressure piston and cylinder for each said work holder for actuating the latter, an individual valve for controlling the flow of pressure fluid to and from each said cylinder, manually operable means including a handle at the front of the machine for actuating each said valve when it indexes to loading station, a feed clutch, and means including manually operable means carried by said handle and operable at will independently of said handle for disengaging said feed clutch.

15. In a machine of the character indicated, an indexible carrier, a plurality of work holders indexible with said carrier, a plurality of tools, means for rotating said work holders and tool holders relatively to each other, a fluid pressure piston and cylinder for each said work holder for actuating the latter, an individual valve for controlling the flow of pressure fluid to and from each said cylinder, manually operable means including a handle at the front of the machine for actuating each said valve when it indexes to loadign station, a feed clutch, and means timed to act just prior to indexing to disengage said feed clutch when said handle is in chuck open position.

ROBERT S. BROWN.